United States Patent [19]
Bird

[11] 3,923,343
[45] Dec. 2, 1975

[54] BOAST ASSISTED CONVEYING SYSTEM
[75] Inventor: Edwin Donald Bird, Houston, Tex.
[73] Assignee: Keystone International, Inc., Houston, Tex.
[22] Filed: Nov. 9, 1973
[21] Appl. No.: 414,298

[52] U.S. Cl. .................. 302/24; 302/26; 302/35
[51] Int. Cl.² ............................................ B65G 53/66
[58] Field of Search ............ 302/47, 24, 53, 29, 35, 302/66, 26, 64; 243/6

[56] References Cited
UNITED STATES PATENTS

| | | | |
|---|---|---|---|
| 1,503,365 | 7/1924 | Hoyt | 302/24 |
| 2,897,005 | 7/1959 | Wiltse | 302/24 |
| 3,295,896 | 1/1967 | Hurtig et al. | 302/26 |
| 3,708,207 | 1/1973 | Steele | 302/24 |
| R24,716 | 10/1959 | Anselman et al. | 302/24 |

Primary Examiner—Evon C. Blunk
Assistant Examiner—Jeffrey V. Nase
Attorney, Agent, or Firm—Murray Robinson; Ned L. Conley; David Alan Rose

[57] ABSTRACT

A pneumatic system for transferring solid particulate or other materials from one location to another, by the use of a pressurized conveying vessel, a conveying line, and boosters located intermittently within said line. The supply flow rate of air or other fluid to each booster is automatically dependent upon the pressure sensed upstream, e.g. at the immediately previous booster or vessel.

2 Claims, 3 Drawing Figures

BOAST ASSISTED CONVEYING SYSTEM

BACKGROUND OF INVENTION

1. Field of the Invention

The invention relates to conveying systems for solid particulate or other materials.

2. Description of the Prior Art

A number of systems for transferring solid particulate or other materials from one location to another are shown by the prior art. For example, a pneumatic system for conveying solids such as sugar cane is set forth in a U.S. Pat. to Hoyt, No. 1,503,365, which shows the use of "regularly-spaced blowers or boosters" in a conduit to aid the transfer of sugar cane from the fields to the mill. As pointed out in this patent, the amount of air being supplied to each booster is controlled by the operator who may judge whether the solid units are arriving with the proper speed and regularity. Each air supply pipe which acts as a booster is attached at a "very acute angle" to the conduit so that the air will push the solid material from the rear through the conduit. The inventor states that should the cane at any time become clogged in the conduits, the operator could cause the air output of one or more boosters to increase and force the clogged material out of the discharge end of the conduit.

Other prior art shows the use of a tank or hopper to hold solid particulate or other material which is to be conveyed and means to pressurize the tank in order to initiate the conveying process. The solids are thereby caused to move into a conveying line located at the bottom of the tank and may be further moved by the use of boosters or jets. See, for example, the U.S. Pat. to Farnham, No. 747,396, and to Sticker, U.S. Pat. No. 758,118, pertaining particularly to sand blasting equipment. In addition, means to aerate the solid particulate material within the tank or vessel by the use of multiple nozzles so as to assist its flow out of the tank and into the conveying line is shown in a U.S. Pat. to Kennedy, No. 2,274,708. A more sophisticated means to aerate or fluidize the materials by the use of a ring-shaped header located at a lower-conical end of a hopper and connected to air manifolds is shown in a U.S. Pat. to Anselman, No. Re.24,716.

The prior art shows the conveying of solid particulate material in both the somewhat continuous phase (Anselman, U.S. Pat. No. Re.24,716) and in the form of slugs (Allen, U.S. Pat. No. 3,380,780). As stated above, a booster directing a single jet of air or other fluid at a "very acute angle" is shown in the patent to Hoyt, U.S. Pat. No. 1,503,365. A booster directing multiple jets of air or other fluid into the conveying line, these jets spaced around the inner circumference of the conveying line, is shown in Anselman, U.S. Pat. No. Re.24,716. The jets discharge air in both an axial and circumferential direction in reference to the conveying line so as to cause the solids to follow a helical or spiral path.

At present, a more sophisticated booster is produced which introduces air around the entire perimeter of the conveying line. Boosters similar to this are manufactured, for example, by Dynamic Air of North St. Paul, Minn. These boosters tend to overcome the sandblast effect caused by single-point air injection which normally results in excessive conveying line wear and some degradation of the solid materials.

One problem with the systems disclosed in the prior art pertains to the degree of operator control required. In order to attempt to operate the systems at their optimum economic levels, a great deal of operator time and skill may be required to adjust the air or other fluid flow to the boosters. The problem is significantly overcome in the system described below which contains the present invention.

SUMMARY OF THE INVENTION

The invention is in a system principally designed to move solid granular, powdery or particulate materials from one location to another by using air or other fluid under pressure.

The system in part consists of a conveying vessel into which solid materials may be charged, a conveying line through which the solid materials may be transferred from the conveying vessel, and boosters located at various points along the line to aid the transfer of the solid materials through the line. The conveying vessel and the boosters may be supplied with pressurized air or other fluid from an external source which is used to force and carry the solid materials through the conveying line. The rate of flow of air or other fluid which is supplied to the first booster located downstream from the conveying vessel is a direct function of the pressure sensed at some point upstream or within the conveying vessel. Likewise, the rate of flow of air or other fluid which is supplied to each subsequent booster is a direct function of the pressure sensed at some point upstream or within the inlet fluid line associated with each immediately preceding or other booster. Hence, the flow of air or other fluid through each booster need not be adjusted or otherwise controlled by an operator or other person.

As the conveying line fills with product, the pressure in the conveying vessel and thereafter at each subsequent booster begins and continues to rise and then levels off and continues relatively steady until the vessel is empty.

In operation, the system is pollution free, quiet, and automated. In addition to its relatively low initial cost, the system operates with a relatively low maintenance cost and, as pointed out above, with very little operator time or control required.

DESCRIPTION OF THE PREFERRED EMBODIMENT

Figure 1:
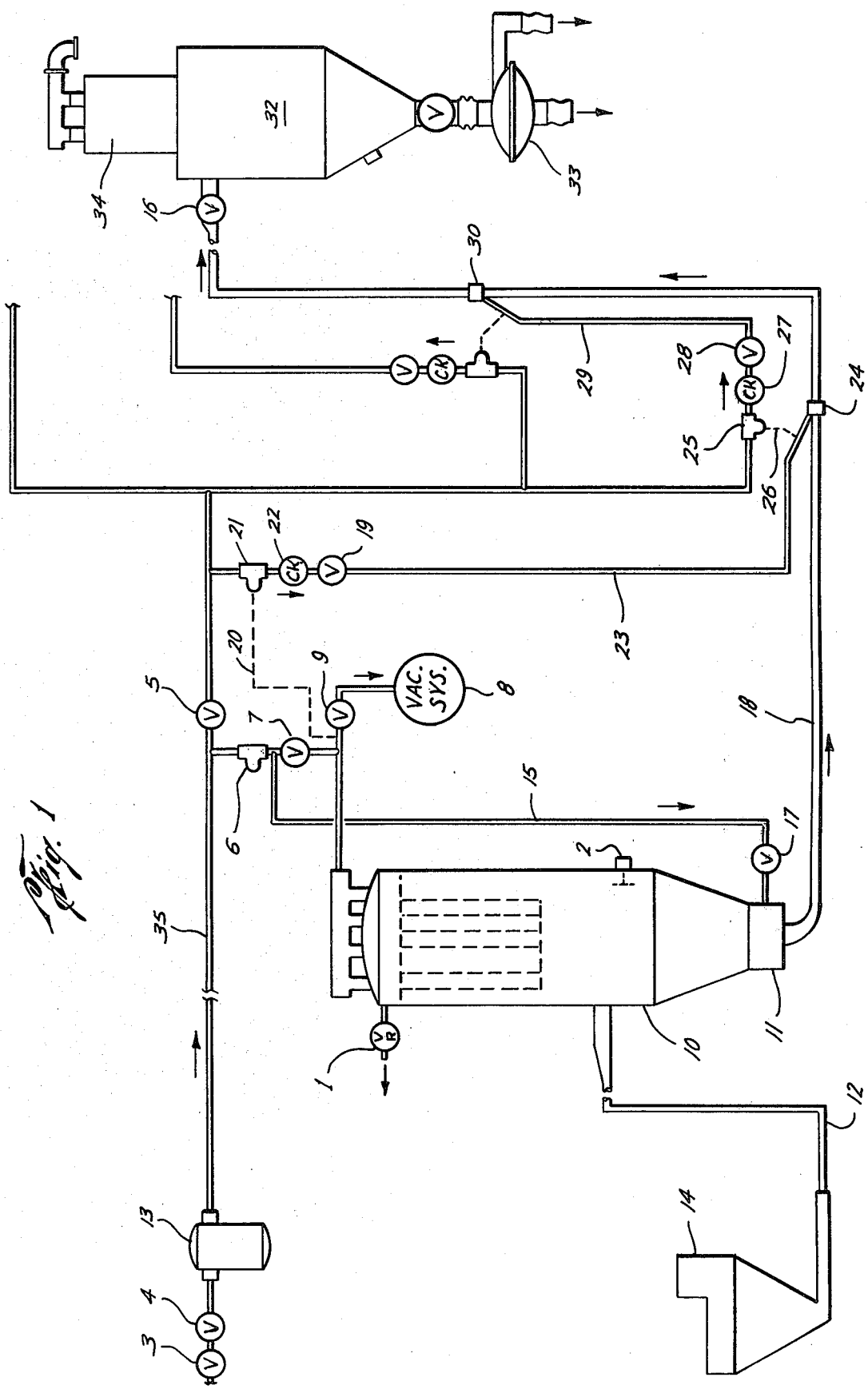
FIG. 1 is a process flow sheet showing one embodiment of the apparatus according to the invention suitable for practicing the method of the invention.

As shown in FIG. 1, a preferred embodiment of the system may consist of a conveying vessel 10 into which solid particles or other materials may be loaded by a number of procedures as described below. See for example, the U.S. Pat. to McIver, No. 3,069,205, which particularly describes a conveying vessel which may be used within the present system. This conveying vessel 10 may be equipped with normal instrumentation including a pressure relief valve 1 and automatic level control 2. Solid particles such as flour, soap powder, dry cement, sea coal, polymer materials, such as polyethylene pellets, sand, glass plant materials, rock salt, and many other materials may be transferred. The vessel 10 may be connected to means including a manually operated pressure regulator 6 and automatic butterfly valve 7 for supplying pressurized fluid such as air to the vessel from an external source and also to means such as a jet system or vacuum pump 8 and automatic butterfly valve 9 for applying a vacuum to the conveying vessel 10.

Although many different fluids may be employed for particular reasons, plant air at 80 psig is most often utilized as a pressurizing means, being supplied through a plant air line 35. A desiccant or other type drying unit 13 may be employed in the plant air line, particularly when dried air is desirable in transferring hygroscopic substances. Upstream from drying unit 13 may be located a manual butterfly valve 3 and automatic butterfly valve 4. Also, as shown in FIG. 1, an automatic solenoid valve 5 may be located downstream from drying unit 13.

Also connected to the conveying vessel may be conveying line 18 which is capable of being used in order to convey the solid particles to a different location. At various locations in the conveying line 18 downstream from the conveying vessel 10 are certain boosters, for example, boosters 24 and 30, which are connected to supply lines containing pressurized air or other fluid, for example, supply lines 23 and 29, which in turn are connected to receive air from the plant air line 35. These boosters may be any type commonly known, including those set forth in the previous description of the prior art.

Pilot operated regulator valves 21 and 25 in supply lines 23 and 29 respectively control the amount of air supplied to each booster. These are valves which begin to open upon application of a low pilot air pressure, e.g. 2 to 3 psig, to valve control means forming a part of the pilot operated regular valves thereby providing an increased opening, and therefore an increased amount of air to the boosters, when pilot air pressure is increased. One example of such a regulator valve is the type RC Series regulators manufactured by Parker Hannifin, of Otsego, Mich. Downstream from this valve may be located a check valve 22 and manually operated globe valve 19. Pilot air for the regulator valve 21 is supplied through a line 20 and for valve 25 is supplied through line 26. As discussed below, the flow rate of air through the first booster located downstream from the conveying vessel 10, that is booster 24, may be dependent upon the pressure sensed within the conveying vessel 10. Although this preferred embodiment is shown in FIG. 1, it should be understood that the pressure may be sensed at any point in line 18 upstream from booster 24. Likewise, the flow rate of air through each subsequent booster, such as booster 30, may be dependent upon the pressure sensed within the inlet air line to the immediately previous booster, such as booster 24, or may be dependent upon the pressure sensed at a point upstream from booster 30. These boosters act, as do those set forth in the prior art, to overcome frictional losses and speed up the transfer.

At the downstream end of the conveying line 18 may be located a fiber drum or other holding hopper 32 for collecting the conveyed solid particles. A breather bag or other dust collector 34 may be attached to the hopper 32 and air from the conveying line is exhausted therethrough. When a low volume of air is used to effect a dense phase transfer, filtration and dust at the receiving end is minimized. Means 33 to segregate the solid particles based upon their size may be located at the bottom of the holding hopper 32.

The process accomplished by the above system is as follows: Referring to FIG. 1, conveying vessel 10 may be filled by gravity or other commonly known means of transporting solid materials. For example, granular or other solid particulate material may be drawn into the conveying vessel 10 through line 12 from sack dump or other vessel 14. This operation may be accomplished by applying a sufficient vaccum to the conveying vessel to move the solid particles out of vessel 14 and into vessel 10, using normal apparatus such as jets or vacuum pumps 8. See, for example, the vacuum transfer system disclosed in the U.S. Pat. to Lloyd, No. 3,316,027. Although it is anticipated that the system would be most frequently used to transfer granular, discrete, or particulate material such as milk powder, titanium dioxide, polyethylene and polyvinyl chloride powders, the system may also function to transfer semi-liquid materials such as slurries and concrete, and even liquid materials.

Figure 2:
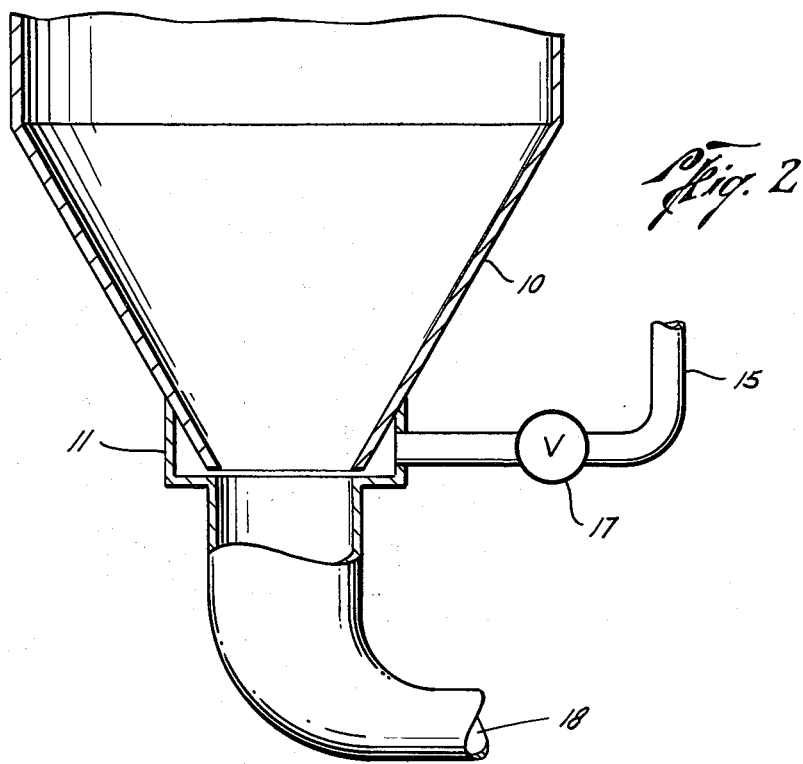
FIG. 2 is a sectional view of the lower portion of the conveying vessel.

After conveying vessel 10 is loaded and sealed, a pressure may be increasingly applied to the vessel by opening automatic butterfly valve 7, and closing valve 9, and the solid particles flowing out the bottom of the vessel are fluidized, the latter being accomplished by normal means such as the use of an aeration ring 11. As shown in FIGS. 1 and 2, an aeration ring 11 is located at the bottom of the vessel 10 and receives pressurized air or other fluid through line 15. Manual or automatic butterfly valve 17 may be inserted into the line to give additional control over the flow rate of fluid admitted into the aeration ring 11. As shown in FIG. 2, a small (often one-sixteenth inch) clearance may be provided for between the bottom of the vessel 10 and the aeration ring 11 to allow the air or other fluid to enter vessel 10 and fluidize its contents. The fluidizing process assists the flow of the solid particles out of the vessel. Fluidization is most useful on fine discrete particles as opposed to coarse or sticky materials.

When the pressure in the conveying vessel 10 reaches a low gage pressure, such as 2 or 3 psi, valve 16 will be energized open, by the use of normal process control instrumentation. At this time the fluidized solid particles may begin to move out of conveying vessel 10 and into conveying line 18. As more solid is forced into and through conveying line 18 due to the increasing flow of air or other fluid admitted to conveying vessel 10, the pressure within the conveying vessel will increase. This result, of course, is due to the fact that additional energy, such as frictional energy, potential energy and kinetic energy is being dissipated due to movement of a progressively larger amount of solid material. The rise in pressure in conveying vessel 10 may be sensed by means of pilot air line 20 or other normal process control instrumentation. As pointed out above, this rise in pressure may be sensed at a point in the conveying line 18 downstream from the conveying vessel 10, but upstream of booster 24. When the pressure in vessel 10 reaches a predetermined point, regulator valve 21 begins to open to allow plant air or other fluid which is under pressure to enter the conveying line through booster 24. The regulator valve may be set to begin to open as soon as there is any pressure build up at all in the vessel 10. The volume flow rate of air which is allowed to enter the conveying line 18 through booster 24 is a function of the pressure within the conveying vessel 10 or at some location in line 18. As the pressure in conveying vessel 10 increases, for example, more air is allowed to enter the conveying line 18 through booster 24. As the pressure in vessel 10 decreases, the air flow through booster 24 is automatically reduced.

As a progressively larger amount of solid begins to fill that portion of conveying line 18 which is downstream of booster 24, the pressure in the air line at the inlet to booster 24 will increase. This increase is again due to the fact that additional energy is being dissipated due to the movement of a progressively larger amount of solid material through that downstream portion of the conveying line 18. This increase in pressure at the inlet to booster 24 may be sensed by means of pilot air line 26 or other normal process control instrumentation. Although, only a preferred embodiment is shown in FIG. 1, it should be understood that the increased pressure may be sensed at some point in line 18, upstream or downstream from booster 24. When the pressure in the inlet line to booster 24, for example, reaches a certain point, regulator valve 25 begins to open to allow plant air which is under pressure to enter the conveying line 18 through booster 30 which is located downstream of booster 24.

Figure 3:
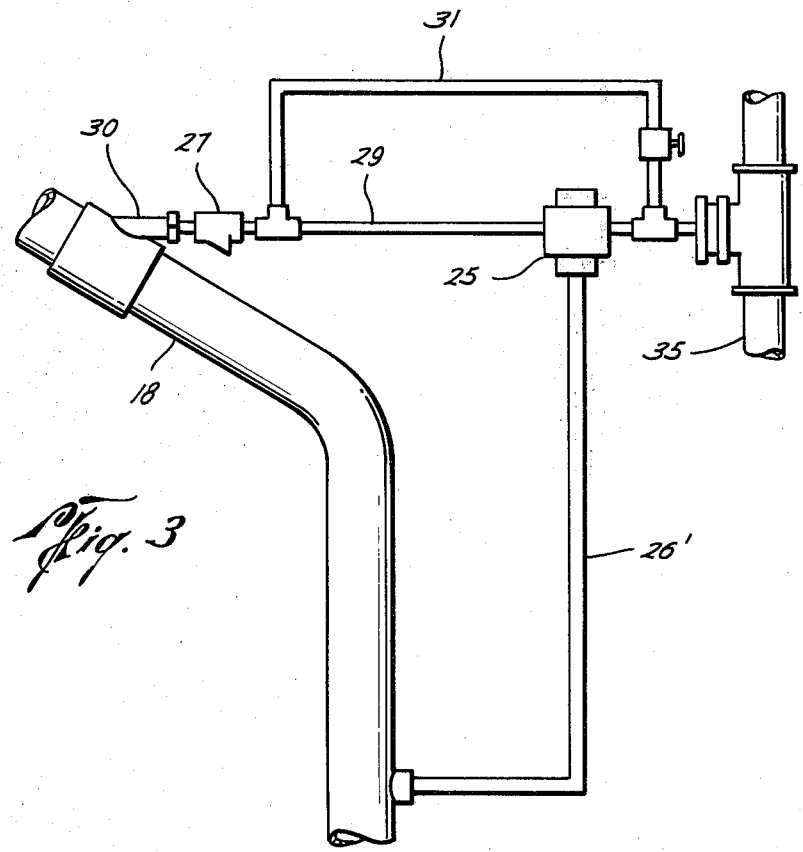
FIG. 3 is a plan view of one embodiment of a booster system.

FIG. 3 shows a booster system which is designated as consisting of booster 30, pilot air line or tap 26', and regulator valve 25, since it differs somewhat from the systems shown in FIG. 2. As is discussed above, the pressure sensing tap may be made at a number of locations including the inlet air line to the previous booster (FIG. 1) or at some point in conveying line 18, this latter embodiment being shown in FIG. 3. As shown here, single point injection boosters may be utilized which meet the conveying line 18 at very acute angles. A manual bypass 31 may be provided. Check valve 27 is used to prevent backup of material or air from conveying line 18 into inlet air line 29. As shown in FIG. 1, a globe valve may also be located in the inlet air line 29 in order to give manual flow control over the air or other fluid utilized.

Similarly, additional booster systems may be located further downstream, each subsequent booster system designed to open or close as a function of the inlet air pressure sensed at each immediately prior booster or at some other upstream point in line 18. As the pressure in the inlet air line of each booster increases, for example, more air is allowed to enter the conveying line 18 through each immediately subsequent booster. As the pressure in each inlet air line decreases, the air flow through each immediately subsequent booster is automatically decreased. As is readily seen, this system acts to minimize the control time which need normally be spent by an operator or other person, since control of booster air flow is completely automatic, in response to process conditions. Also, since clogging of a line normally results in a pressure increase, the system in operation automatically acts to prevent clogging.

Toward completion of the conveying cycle, the air pressure in the conveying vessel 10 decreases, as the amount of solid particles in the conveying vessel and line decreases, which systematically causes air flow to each booster to be discontinued automatically.

The number of booster systems required, the air pressure used, and the operation of the systems depend of course on the quantity and type of work to be done, the time limits, and the economics involved.

The system of this invention may be used to transfer solids in the dense phase (high solids to fluid ratios) which tends to reduce dust, degradation of the material, and attrition problems, the latter being particularly prevalent in the case of the transfer of highly abrasive materials such as silica and shot blast.

The system is particularly advantageous for the handling of abrasives or frangible materials, or materials which tend to smear, such as polyethylene pellets, because much lower velocities than normal can be used.

Another advantage of the system is that it is entirely pneumatic, no electrical controls being required.

It may be desirable to use inert conveying gases for powders susceptible to explosion, and dense phase transfer permits the economic use of these gases. The system may be constructed to have no moving parts when in operation, other than parts within normal process control instrumentation. This result follows from the fact that the work or energy required to transfer the solid materials is supplied by air or other fluid under pressure.

As stated, many variations to the above preferred embodiment will be apparent to those skilled in the art. It is impractical to show and describe all the variations included within the invention and as a result the embodiments described should be considered illustrative only, and not limiting — the scope of the invention being as broad as is defined by the appended claims. The form of the claims and the specification, including the Abstract, is adopted solely for explanation and should not be considered in interpreting the scope of the invention as claimed.

I claim:

1. A conveying system for conveying a mixture of fluid and particulate matter comprising:
    an upstream portion and a downstream portion,
    means for causing a mixture of fluid and particulate matter to flow continuously under pressure, through said upstream portion and into and through said downstream portion, and
    means for injecting additional fluid into said downstream portion, said injecting means including
    sensing means for sensing the pressure in said upstream portion,
    a variable opening valve for controlling the amount of fluid injected, and
    valve control means operably connected to said sensing means and to said valve, said valve control means including means for opening the valve in response to an increase in the sensed pressure, to further open the valve in response to a further increase in the sensed pressure, and to decrease the valve opening in response to a decrease in the sensed pressure.

2. In apparatus for conveying a mixture of gaseous fluid and particulate material comprising:
    a conveying vessel having an outlet,
    means for supplying gaseous fluid under pressure to said conveying vessel, and
    a conveying line attached to said outlet of said conveying vessel,
    the improvement which comprises
    a first booster located in said line,
    means connecting said first booster to a supply of gaseous fluid under pressure,
    a first regulating means for varying the flow of the supply of gaseous fluid to the first booster in response to variations in the fluid pressure within the conveying vessel,
    a second booster located in said conveying line at a point downstream from said first booster, means connecting said second booster to a supply of gaseous fluid under pressure, and a second regulating means for varying the flow of the supply of fluid to the second booster in response to variations in the fluid pressure at a point in said conveying line upsteam of said second booster, said first and second boosters including injector means for promoting the continuous flow of material and gaseous fluid through said conveying line by injecting such gaseous fluid into the conveying line, said regulating means each including sensing means for sensing the respective variations in pressure, a variable opening valve for controlling the amount of gaseous fluid injected by the injector means, and valve control means operably connected to said sensing means and to said valve, said valve control means including means for opening the valve in response to an increase in the sensed pressure, to further open the valve in response to a further increase in the sensed pressure, and to decrease the valve opening in reponse to a decrease in the sensed pressure.

* * * * *

UNITED STATES PATENT AND TRADEMARK OFFICE
CERTIFICATE OF CORRECTION

PATENT NO. : 3,923,343
DATED : DECEMBER 2, 1975
INVENTOR(S) : EDWIN DONALD BIRD

It is certified that error appears in the above-identified patent and that said Letters Patent are hereby corrected as shown below:

Cover page, item [54]:

Delete "BOAST" and insert -- BOOST --.

$Signed and Sealed this$ sixth Day of April 1976

[SEAL]

Attest:

RUTH C. MASON
*Attesting Officer*

C. MARSHALL DANN
*Commissioner of Patents and Trademarks*